United States Patent

Sato

[11] Patent Number: 5,313,313
[45] Date of Patent: May 17, 1994

[54] IMAGE PROCESSING APPARATUS

[75] Inventor: Takako Sato, Yokohama, Japan
[73] Assignee: Ricoh Company, Ltd., Tokyo, Japan
[21] Appl. No.: 784,889
[22] Filed: Oct. 30, 1991
[30] Foreign Application Priority Data
  Oct. 30, 1990 [JP] Japan .................. 2-290812
[51] Int. Cl.$^5$ ........................... H04N 1/46
[52] U.S. Cl. ........................... 358/514; 358/515
[58] Field of Search .......... 358/75, 78, 80, 504, 358/514, 515

[56] References Cited

U.S. PATENT DOCUMENTS 4,264,921  4/1981  Pennington et al. ............ 358/78
4,819,193  4/1989  Imao ........................... 358/75

FOREIGN PATENT DOCUMENTS 6350261  3/1988  Japan .

Primary Examiner—Edward L. Coles, Sr.
Assistant Examiner—Thomas L. Stoll
Attorney, Agent, or Firm—Oblon, Spivak, McClelland, Maier & Neustadt

[57] ABSTRACT

An image processing apparatus capable of enhancing the sharpness of characters and lines. A unidimensional color scanner has a plurality of kinds of photoelectric transducer elements for different colors which are arranged regularly in a unidimensional direction. The scanner outputs, when the center of a pixel of interest to be processed is coincident with a first color transducer element, a color signal associated with the pixel of interest as a first color signal. When the center of the pixel of interest is not coincident with the first color, the scanner outputs the sums of values inversely proportional to the distances of the outputs of the transducer element of desired wavelength bands which have centers thereof located at both sides of the pixel of interest as a second and a third color signal. A correcting section corrects the first color signal such that the MTF characteristics of color signals from the scanner coincide. An image processing section processes an image by the first color signal corrected by the correcting section as second and third color signals. A deciding section may be provided for determining the characteristic of an image signal area by area. Then, the image processing section will process color signals from the scanner on the basis of the area-by-area characteristic.

6 Claims, 8 Drawing Sheets

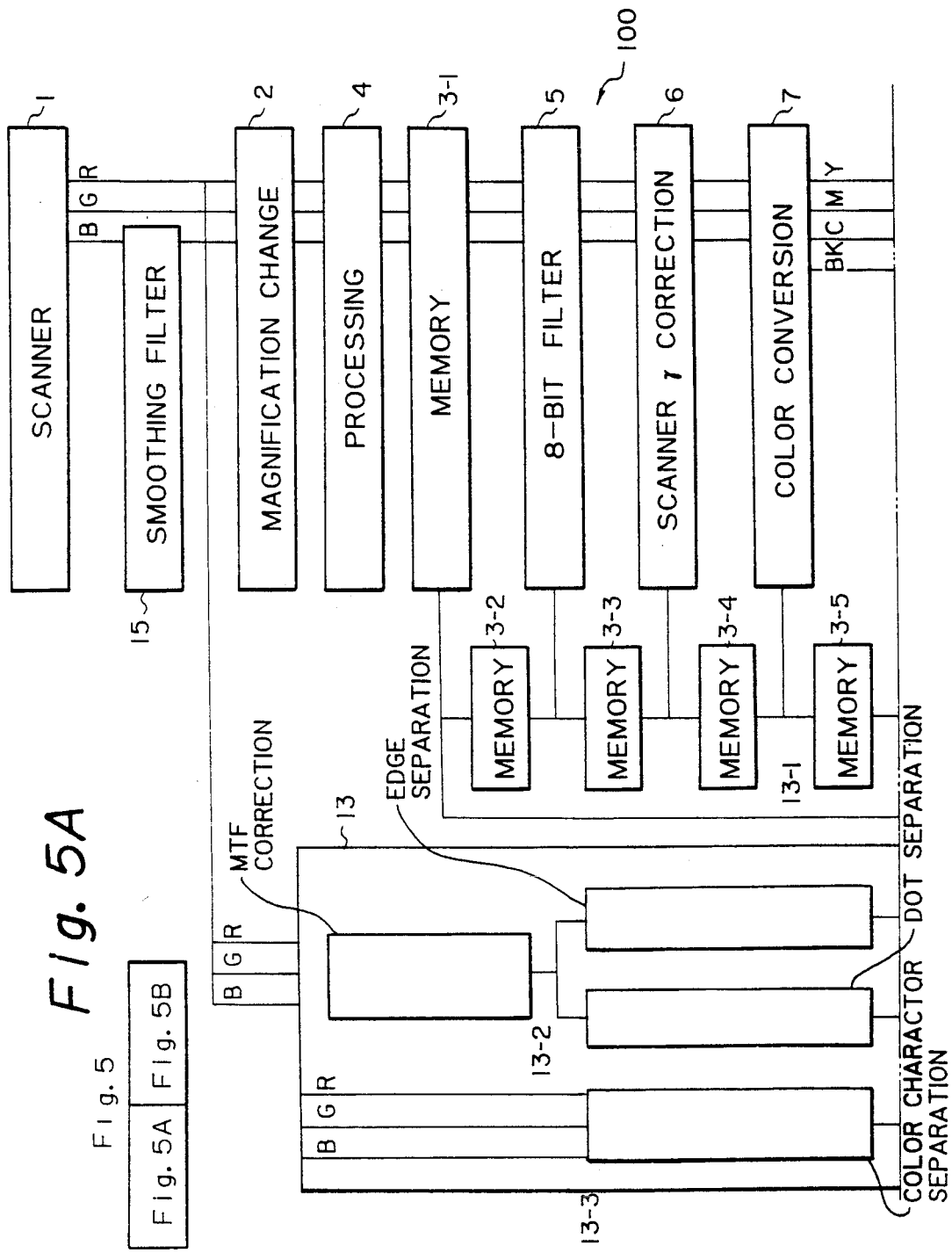

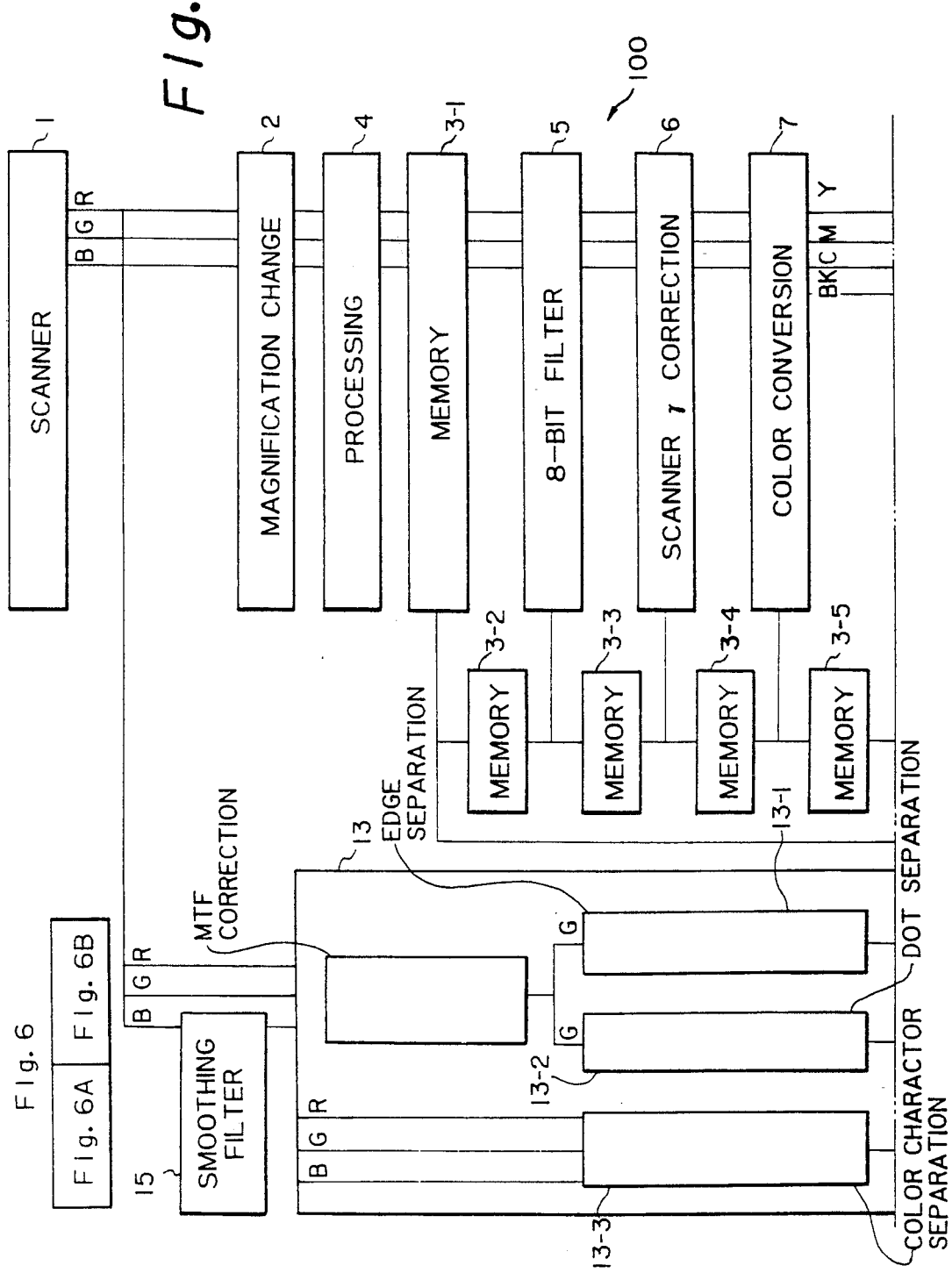

IMAGE PROCESSING APPARATUS

BACKGROUND OF THE INVENTION

The present invention relates to an image processing apparatus applicable to a copier or similar recording equipment and capable of enhancing the sharpness of characters and lines.

An image processing apparatus for the above application generally has color separation filters arranged regularly in association with CCD (Charge Coupled Device) or similar photoelectric transducer elements and processes R, G and B signals separated by such filters. It has been customary with this type of image processing apparatus to use a group of photoelectric transducer elements each being capable of converting light of particular wavelength band. Specifically, a plurality of groups of such transducer elements are arranged regularly in a unidimensional direction. When the center of a pixel to be processed is coincident with the center of a transducer element of desired wavelength (e.g. blue (B)), the output signal of such a transducer element is selected; if the former is not coincident with the latter, there is selected the sum of values inversely proportional to the intercenter distances of the outputs of transducer elements of other desired wavelength bands (e.g. red (R) and green (G)) which have the centers thereof located at both sides of the above-mentioned transducer element. This kind of scheme is disclosed in, for example, Japanese Patent Laid-Open Publication (Kokai) No. 50261/1988 and can read the position of an image with accuracy by linearly interpolating the positional deviation of dot among R, G and B by use of two pixels neighboring a pixel of interest.

However, the problem with the above-described image processing apparatus is that a weighting and averaging procedure is indispensable to implement the linear interpolation. The weighting and averaging procedure needs a digital filter having a low pass characteristic. Such a digital filter suppresses the high frequency components of an image to thereby lower the sharpness of characters and lines. For example, assuming that the center of a pixel of interest is B and positioned between R and G, R and G images are blurred. To eliminate this problem ascribable to linear interpolation, Japanese Patent Laid-Open Publication No. 126076/1989 discloses a method which interpolates by referencing data of a plurality of pixels the image data in which two colors other than a reference color have been shifted relative to the reference color by, for example, a±(⅓) dot. This method, however, does not read an image located on the same position of a document and, therefore, cannot execute color correction or undercolor removal essential to, for example, a digital color copier with accuracy.

SUMMARY OF THE INVENTION

It is, therefore, an object of the present invention to provide an image processing apparatus applicable to a copier or similar recording equipment and capable of enhancing the sharpness of characters and lines.

It is another object of the present invention to provide a generally improved image processing apparatus for recording equipment.

In accordance with the present invention, an image processing apparatus has an unidimensional color scanner having a plurality of kinds of photoelectric transducer elements which are arranged regularly in a unidimensional direction and each photoelectrically converts light of a particular wavelength band. The scanner outputs, when the center of a pixel of interest to be processed is coincident with the center of the transducer element responsive to a desired wavelength band, a color signal associated with the transducer element as a first color signal; when the former is not coincident with the latter, the scanner outputs the sums of values inversely proportional to the distances of the outputs of the transducer elements which have centers thereof located at both sides of the particular transducer element and have desired wavelength bands from the center of the pixel of interest as a second and a third color signal. A correcting section corrects the first color signal such that the MTF characteristics of color signals from the scanner coincide. An image processing section processes an image by the first color signal corrected by the correcting section and the second and third color signals.

Also, in accordance with the present invention, an image processing apparatus has an unidimensional color scanner having a plurality of kinds of photoelectric transducer elements which are arranged regularly in an unidimensional direction and each photoelectrically converts light of a particular wavelength band. The scanner outputs, when the center of a pixel of interest to be processed is coincident with the center of the transducer element responsive to a desired wavelength band, a color signal associated with the transducer element as a first color signal; when the former is not coincident with the latter, the scanner outputs the sums of values inversely proportional to the distances of the outputs of the transducer elements of desired wavelength bands which have centers thereof located at both sides of the particular pixel and have desired wavelength bands from the center of the pixel of interest as a second and a third color signal. A correcting section corrects the first color signal such that the MTF characteristics of color signals from the scanner coincide. A deciding secion determines the characteristic of an image signal area by area on the basis of the first color signal corrected by the correcting section and the second and third color signals. An image processing section processes color signals from the scanner on the basis of the characteristic determined area by area by the deciding section.

BRIEF DESCRIPTION OF THE DRAWINGS

The above and other objects, features and advantages of the present invention will become more apparent from the following detailed description taken with the accompanying drawings in which:

FIGS. 5A and 5B are block diagrams schematically showing an alternative embodiment of the present invention; and FIGS. 6A and 6B are block diagrams schematically showing another alternative embodiment of the present invention.

DESCRIPTION OF THE PREFERRED EMBODIMENTS

Figure 1:
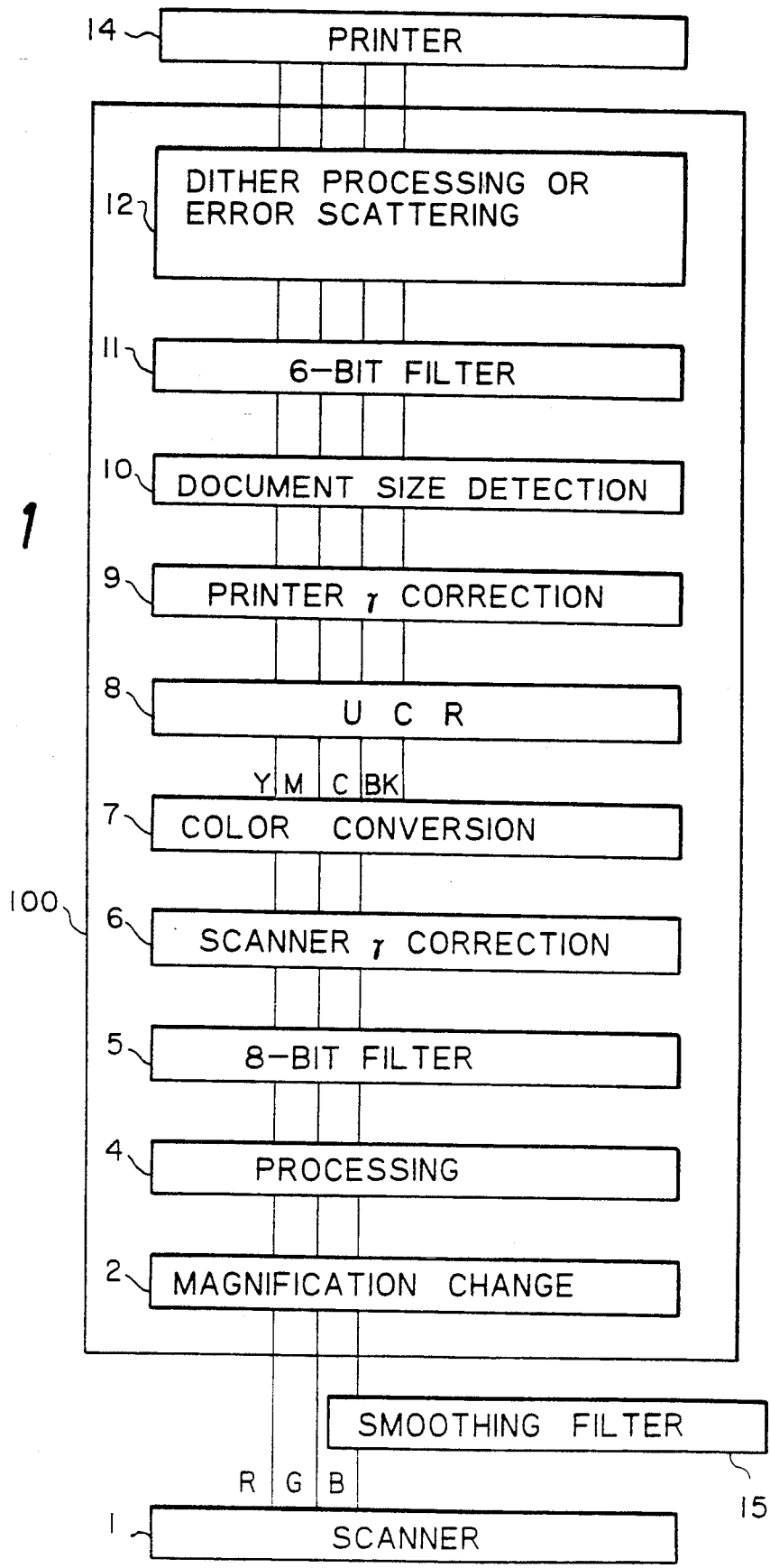
FIG. 1 is a block diagram schematically showing an image processing apparatus embodying the present invention.
Figure 2:
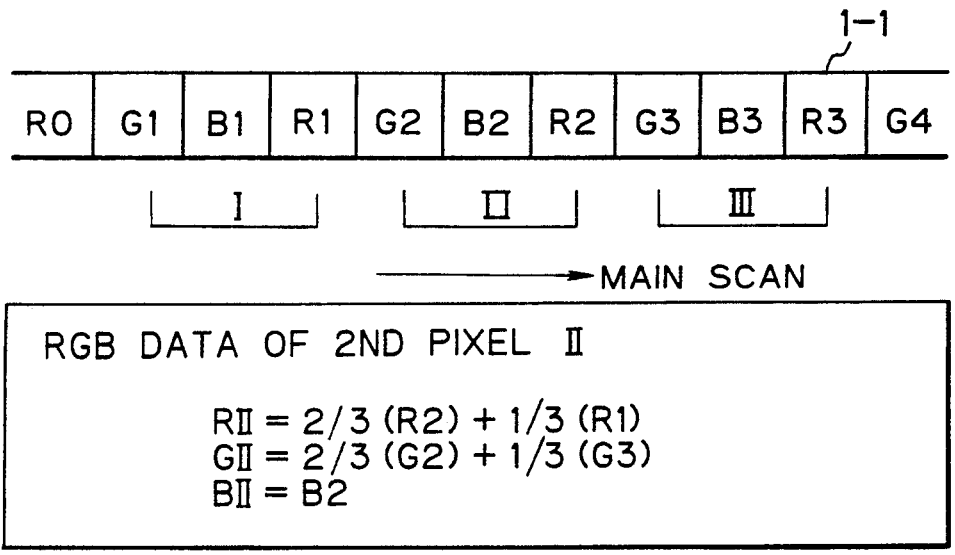
FIG. 2 shows a color separation filter incorporated in a scanner which is included in the embodiment.
Figure 3A:
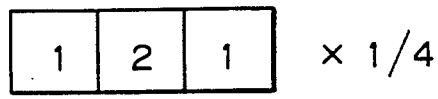
FIGS. 3A and 3B each demonstrates the operation of a smoothing filter also included in the embodiment.
Figure 3B:
Figure 4A:
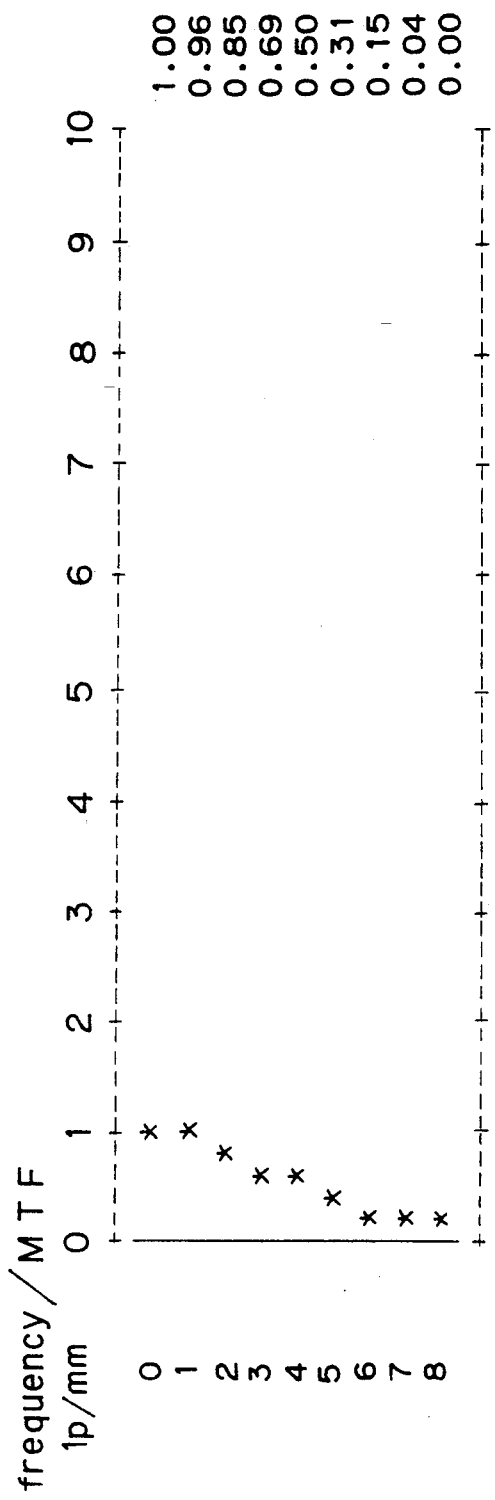
FIGS. 4A and 4B are graphs showing the MTF characteristics of the filters depicted in FIGS. 3A and 3B, respectively.
Figure 4B:
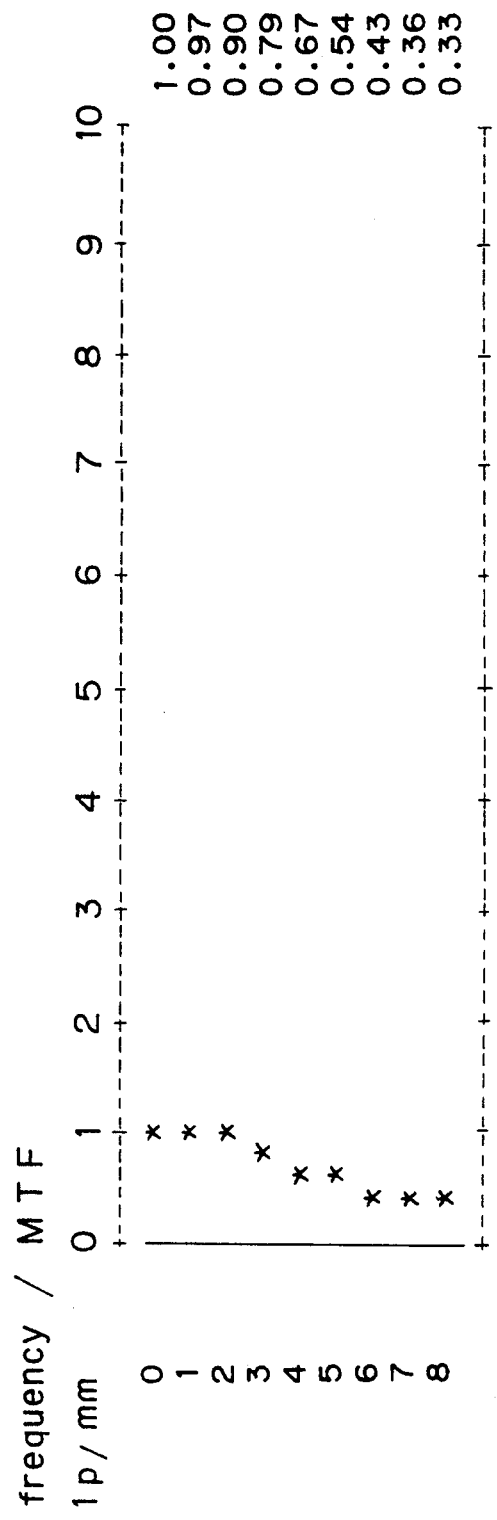

Referring to FIG. 1 of the drawings, an image processing apparatus embodying the present invention is shown and includes a scanner 1. As shown in FIG. 2, a color separation filter 1-1 which the scanner 1 uses has a plurality of groups of red (R), green (G) and blue (B) pixels sequentially arranged in this order. Each signal read by the scanner 1 is converted to, for example, 8-bit digital data. In the illustrative embodiment, color data RII, GII and BII of a second pixel II of the scanner 1 are produced by equations also shown in FIG. 2, i.e.:

$$RII = \tfrac{2}{3}(R2) + \tfrac{1}{3}(R1)$$

$$GII = \tfrac{2}{3}(G2) + \tfrac{1}{3}(G3)$$

$$BII = B2$$

Specifically, when the reference position of a pixel to be processed is coincident with a desired wavelength band B, the output of the scanner 1 is fed out as blue data B as it is. When the reference position of the pixel of interest is not coincident with the desired wavelength band B, the sum of values inversely proportional to the distances of the outputs of desired wavelengths R and G of the scanner 1 which are located at both sides of the wavelength band B from the reference position are outputted.

FIGS. 3A, 3B, 4A and 4B show specific characteristics of a smoothing filter 15, FIG. 1, which processes the blue data B ready by the scanner 1. The smoothing filter 15 smooths the blue data B such that the MTF (Modulation Transfer Function) or spatial frequency transfer characteristic characteristics of the color data RII, GII and BII coincide. This allows the color balance of an edge portion to be restored to original.

Referring again to FIG. 1, the red data RII and green data GII from the scanner 1 and the blue data BII from the smoothing filter 15 are applied to an image processing section 100. The image processing section 100 has a magnification change 2 for changing the magnification of the input color data RII, GII and BII by a commanded magnification. The color data RII, GII and BII undergone magnification change are fed to a processing 4 which has slanting, shadowing, blanking, painting and other processing capabilities. Therefore, an image is manipulated by the processing 4 as commanded by the operator. The processing 4 has a painting circuit capable of deleting a desired area of an image by painting a character or a pattern existing therein. To slant characters only, the processing 4 is capable of processing the image data by using an oblique rectangular unit or on a line basis. Specifically, as the operator commands slanting and marks a particular area of an image to be slanted, the processing 4 manipulates the image data on a rectangle basis or on a line basis. In this case, the processing 4 may slant only black characters or color characters as selected by the operator.

An 8-bit filter 5 effects either of local density processing with the outputs of the processing 4 in matching relation to the reading characteristic of the scanner 1 and the MTF correction of the scanner 1. A gamma correction 6 corrects the gamma characteristic or tonal characteristic of the scanner 1. A color conversion 7 converts the R, G and B signals to, for example, 6-bit yellow (Y), magenta (M), cyan (C) and black (BK) signals for recording. A UCR (Under Color Removal) 8 removes the background or undercolor of a document image. A printer gamma correction 9 corrects the gamma characteristic of a printer 14. A document size detection 10 detects a document size corresponding to the image size. A 6-bit filter 11 enhances the edges of characters and smooths pattern as distinguished from characters. A dither processing or error scattering 12 processes patterns and characters evenly by using suitable tones and resolution and then delivers the processes patterna and characters to the printer 14. The printer 14 records a color image by scanning the individual processed color signals fed thereto from the image processing section 100.

In the illustrative embodiment the color separation filters 1-1 are arranged regularly in the scanner 1. The scanner 1, therefore, prevents the MTF characteristics of R, G and B at edges from failing to coincide in the event when the positional deviation is corrected. This is successful in reproducing a high quality image without reducing the sharpness of characters and lines.

Figure 5B:
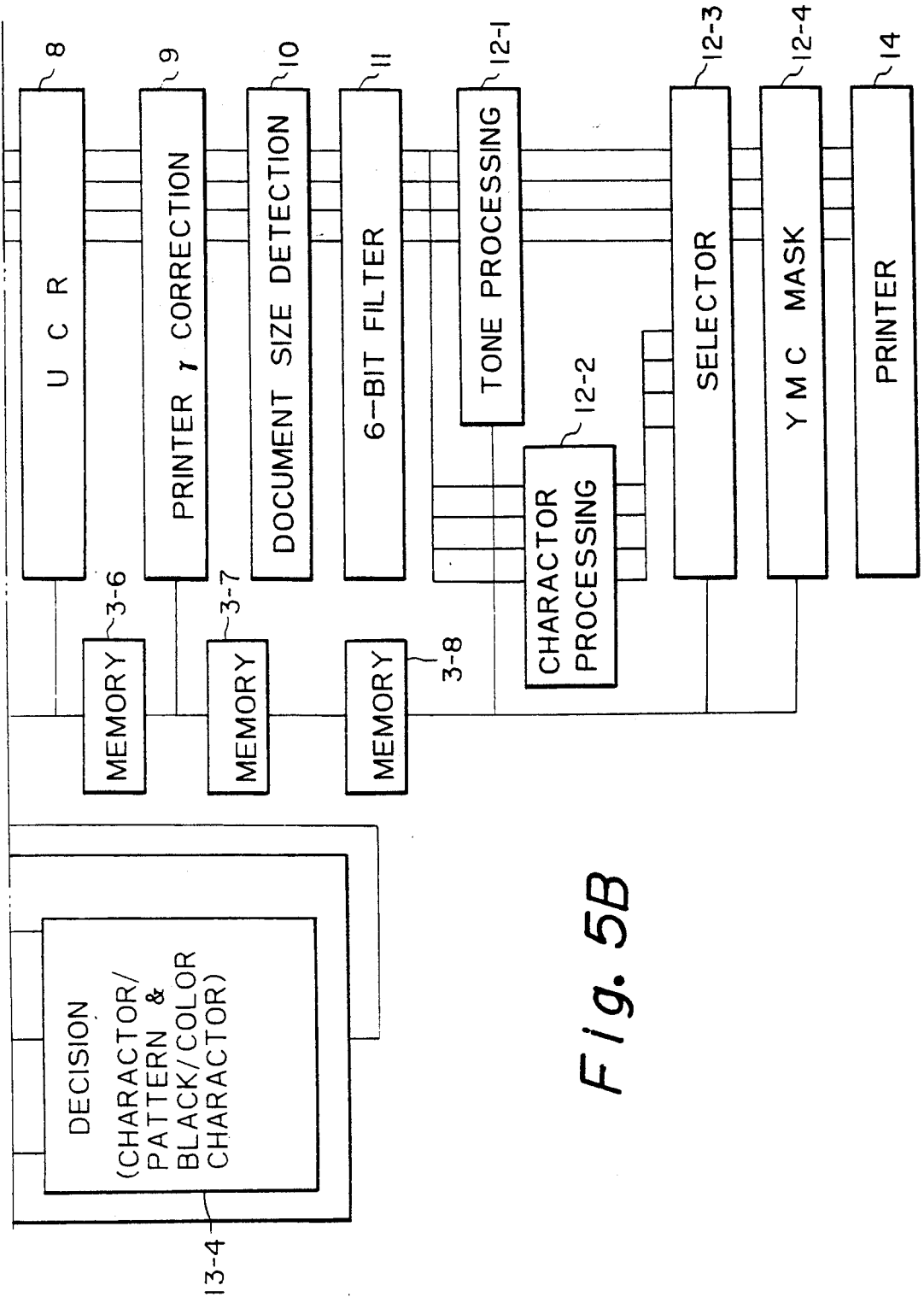

Referring to FIG. 5, an alternative embodiment of the present invention is shown and has an area separating section 13 for processing an input image area by area. This embodiment also uses the color separation filter 1-1, FIG. 2, having R, G and B pixels sequentially arranged in this order. Each signal read by the scanner 1 is converted to, for example, 8-bit digital data. The color data RII, GII and BII of the second pixel II of the scanner 1 are also produced by the equations shown in FIG. 2, i.e.:

$$RII = \tfrac{2}{3}(R2) + \tfrac{1}{3}(R3)$$

$$GII = \tfrac{2}{3}(G2) + \tfrac{1}{3}(G3)$$

$$BII = B2$$

Then, the smoothing filter 15 smooths the blue data B such that the MTF or spatial frequency transfer characteristic of the color data RII, GII and BII coincide. The red data RII and green data GII from the scanner 1 and the blue data BII from the smoothing filter 15 are applied to the image processing section 100 and changed in magnification by a commanded ratio by the magnification change 2. The color data RII, GII and BII undergone magnification change are processed by the processing 4 as commanded by the operator. The color data from the processing 4 are written to a memory 3-1. The red and green data RII and GII from the scanner 1 and the blue data B from the smoothing filter 15 are fed to the previously mentioned area separating section 13 also. The area separating section 13 determines the characteristic of the document image area by area. Specifically, this section 13 has an edge separation 13-1 which stores in advance several different patterns each being representative of a characteristic of an edge. The section 13 compares the document image with each of the stored patterns to thereby separate characters from the document image.

The edge separation 13-1 produces only data representative of the contours of characters, i.e., it does not recognize the inside of characters or the background surrounding the characters as characters. Therefore, when only the resolution of characters should be increased to enhance the quality of characters, the areaby-area data need only to be dealt with as they are. However, when a particular image area should be manipulated in a particular manner, a character, for example, is recognized by a rectangle, and the data undergone edge separation as stated above are expanded upward, downward, rightward and leftward. Characters are, therefore, handled in a rectangular area. A dot separation 13-2 separates a pattern area representative of a picture or dots by determining the highest and lowest values in terms of the density of a pixel of interest and pixels surrounding it. A color character separation 13-3 separates black portions and chromatic portions of characters by use of the R, G and B signals, based on the fact that the values |R-G|, |G-B| and |B-R| in black are small. Regarding the data to be used by the edge separation 13-1 and dot separation 13-2, use may be made of any one of the following methods:

(1) ORing the results of separation effected with each of the R, G and B systems;
(2) Using the maximum values of R, G and B data;
(3) Calculating luminosity by using R, G and B data; and
(4) Using only G data to simplify hardware.

Since the above method (4) uses only one of R, G and B data, part of the color data is necessarily lost. G data does not absorb yellow Y. However, since yellow on a white background is low in resolution due to the visual characteristic of a human being, it is hard to recognize despite the separation and high resolution processing. Hence, when only one color system is to be used, G data is most desirable.

In FIG. 5, the data separated by the edge separation 13-1, dot separation 13-2 and color character separation 13-3 are applied to a decision 13-4. In response, the decision 13-4 delivers to the memory 3-1 and a memory 3-2 are data having two bits upper one of which shows whether the data is representative of a picture or dots or a character and lower one of which shows whether the character is black or colored. It is to be noted that the number of bits of the area data is open to choice and depends on the number of processing functions available with the processing 4. For example, when the processing 4 is of the type which cannot process black characters and color characters separately, only one bit which distinguishes characters from patterns such as pictures dots images suffices. The image processed by the processing 4 and written to the memory 3-1 is read out in synchronism with the read-out of area data from the memory 3-2. The 8-bit filter 5 performs, based on the area data, either of local density processing matching the reading characteristic of the scanner 1 and the MTF correction of the scanner 1. The area data in the memory 3-2 is transferred to a memory 3-3 also, and the output of the filter 5 appears in synchronism with the read-out of area data from the memory 3-3. The scanner gamma correction 6 corrects the gamma or tonal characteristic of the scanner 1 in such a manner as to enhance the removal of the background of characters while suppressing the removal of the background of patterns.

The area data in the memory 3-3 is transferred to a memory 3-4, and the output of the scanner gamma correction 6 appears in synchronism with the read-out of area data from the memory 3-4. The color conversion 7 converts the R, G and B signals to 6-bit color signals Y, M, C and BK for recording and, at the same time, sets up a higher background removal ratio for black characters by the area data. The area data in the memory 3-4 is written to a memory 3-5, and the output of the color conversion 7 appears in synchronism with the read out of area data from the memory 3-5. The UCR 8 removes the background or undercolor of the document image on the basis of the background removal ratios set by the scanner gamma correction 6 and color conversion 7. The area data in the memory 3-5 is transferred to a memory 3-6, and the output of the UCR 8 appears in synchronism with the read-out of area data from the memory 3-6. The printer gamma correction 9 corrects the gamma or tonal characteristic of the printer 14 by the area data in matching relation to each of characters and patterns. The document size detection 10 detects a document size corresponding to the image size. The area data in the memory 3-6 is transferred to a memory 3-7, and the output of the document size detection 10, i.e., color signals appear in synchronism with the read-out of area data from the memory 3-7. The 6-bit filter 11 enhances the edges of characters and smooths patterns by the area data. The area data in the memory 3-7 is written to a memory 3-8, and the output of the filter 11 appears in synchronism with the read-out of area data from the memory 3-8.

A tone processing 12-1 stores a dither pattern suitable for patterns and effects halftone processing with patterns by using the area data. A character processing 12-2 stores a dither pattern suitable for characters and enhances characters by the area data. A selector 12-3 selects either of the signals processed by the processings 12-1 and 12-2 on the basis of the area data read out of the memory 3-8. In the case of a black character, only the black signal BK is fed to the printer 14 via a YMC mask 12-4. As a result, the color signals Y, M, C and BK are sequentially applied to the printer 14 one at a time. The printer 14 prints out a color image by scanning the individual color signals Y, M, C and BK processed area by area by the image processing section 100.

The tone processing 12-1 and character processing 12-2 assigned to patterns and characters, respectively, may be replaced with a dither processing or error scatter processing unit which processes image data evenly by suitable tones and suitable resolution, as in the embodiment shown in FIG. 1. This will reduce the cost of the apparatus. In the case of such even processing, too, the YMC mask 12-4 masks Y, M and C when the character is a black character.

The illustrative embodiment, like the previous embodiment, prevents the MTF characteristics of R, G and B at edges from failing to coincide in the event when the positional deviation is corrected. This, coupled with the fact that the area separating section 13 separates characters, black characters and color characters, and patterns such as pictures and dot images area by area to allow them to be processed on an area basis, insures the reproduction of a high quality image without reducing the sharpness of characters and lines.

Figure 6B:
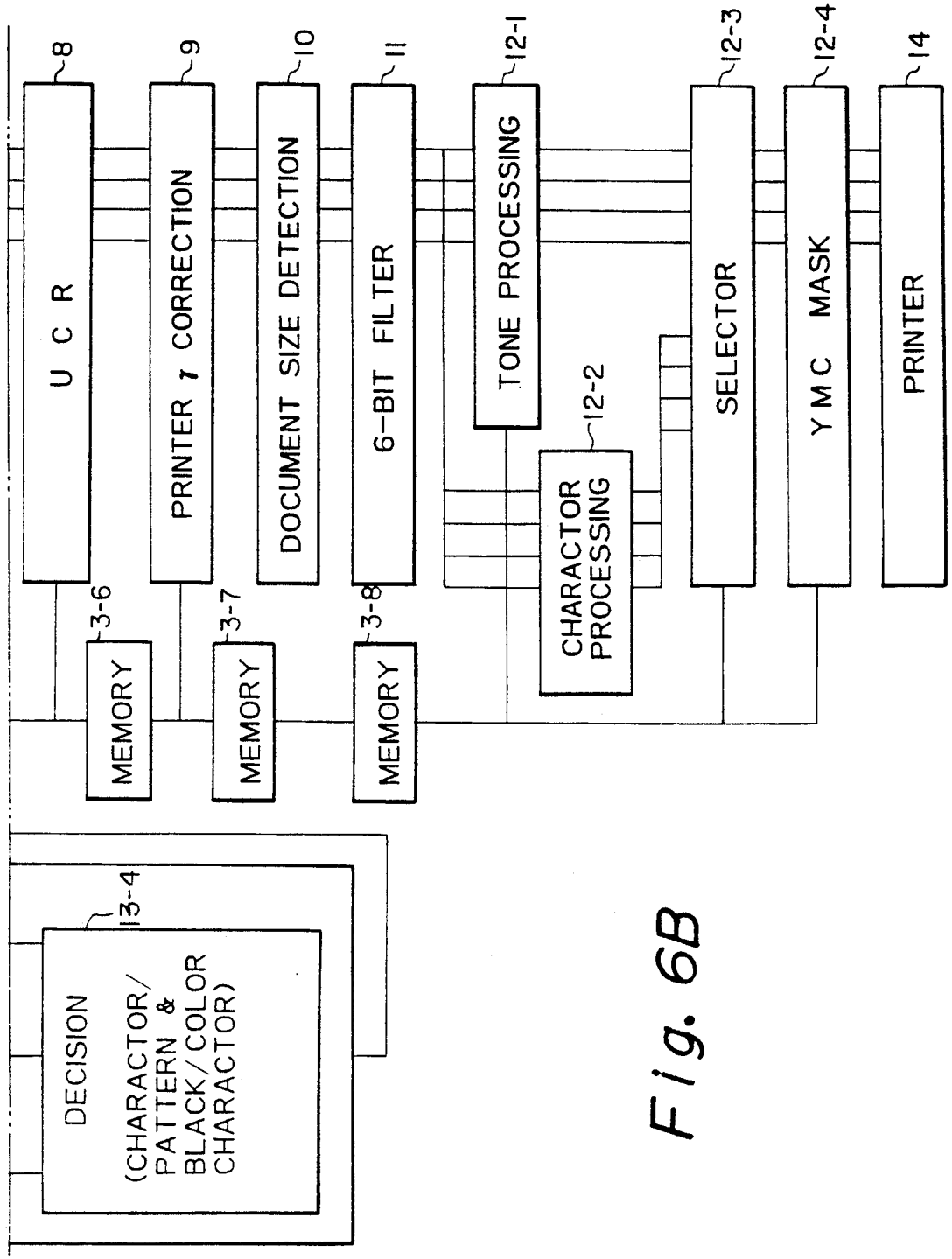

Referring to FIG. 6, another alternative embodiment of the present invention will be described. In this embodiment, the image processing section 100 processes R, G and B data by using B data which is not smoothed, while the area separating section 13 separates images by using blue data which is smoothed by the smoothing filter 15. In this embodiment, too, the area separating section 13 separates characters, black characters and color characters, and patterns such as pictures and dot images area by area by using the red data RII and green data GII, FIG. 2, from the scanner 1 and the blue data BII, FIG. 2, smoothed by the smoothing filter 15. As a result, the characteristic of each image area is determined to reproduce a high quality image with clear-cut characters and lines.

In summary, the present invention provides an image processing apparatus having various unprecedented advantages, as enumerated below.

(1) The color balance of edges is restored to original to thereby increase the sharpness of characters and lines.

(2) Color correction and UCR correction which are essential to a digital color copier, for example, are executed with accuracy.

(3) Characters and patterns are accurately distinguished from each other.

(4) A color separation filter has a simple construction.

(5) The MTF characteristics of individual color signals are matched by a simple arrangement.

Various modifications will become possible for those skilled in the art after receiving the teachings of the present disclosure without departing from the scope thereof.

What is claimed is:

1. An image processing apparatus comprising:
   unidimensional color scanning means comprising a plurality of pixels each having a plurality of kinds of photoelectric transducer elements with each kind converting a different color of light, said elements being arranged regularly in a unidimensional direction with a first color transducer element at the center of each pixel and second and third color transducer elements being at a point other than the center of each pixel;
   said color scanning means outputting for a subject pixel a first color signal equal to the output from said first color transducer element and second and third color signals which are equal to the sums of the outputs from two of the second and third transducer elements, respectively, which are closest to the center of the subject pixel, divided by their relative distances from the center of the subject pixel;
   smoothing filter for correcting said first color signal such that the MTF characteristics of color signals from said unidimensional color scanner means coincide; and
   image processing means for processing an image by said first said color signal corrected by said smoothing filter and said second and third color signals.

2. An apparatus as claimed in claim 1, wherein said second signal is equal to the sum of two-thirds times the output of the second transducer element of the subject pixel plus one-third times the output of the closest second transducer element; and
   wherein said third color signal is equal to the sum of two-thirds times the output of the third transducer element of the subject pixel plus one-third times the output of the closest third transducer element.

3. An apparatus as claimed in claim 1, further comprising:
   deciding means for determining the characteristic of an image signal area by area on the basis of said first color signal corrected by said correcting means and said second and third color signals;
   said image processing means processing said first color signal corrected by said smoothing filter and said second and third color signals on the basis of the characteristic determined area by area by said deciding means.

4. An apparatus as claimed in claim 1, wherein said unidimensional color scanner means comprises regularly arranged R, G and B filter elements.

5. An imaging processing apparatus comprising:
   unidimensional color scanning means comprising a plurality of pixels each having a plurality of kinds of photoelectric transducer elements with each kind converting a different color of light, said elements being arranged regularly in a unidimensional direction with a first color transducer element at the center of each pixel and second and third color transducer elements being at a point other than the center of each pixel;
   said color scanning means outputting for a subject pixel a first color signal equal to the output from said first color transducer element and second and third color signals which are equal to the sums of the outputs from two of the second and third transducer elements, respectively, which are closest to the center of the subject pixel, divided by the relative distances from the center of the subject pixel;
   smoothing filter for correcting said first color signals such that the MTF characteristics of color signals from said unidimensional color scanner means coincide;
   deciding means for determining the characteristic of an image signal area by area on the basis of said first color signal corrected by said smoothing filter and said second and third color signals; and
   image processing means for processing color signals from said unidimensional color scanning means on the basis of the characteristics determined area by area by said deciding means.

6. An apparatus as claimed in claim 5, wherein said unidimensional color scanner means comprises regularly arranged R, G and B filter elements.

* * * * *